(12) United States Patent
LeBoeuf, Jr.

(10) Patent No.: US 7,261,626 B1
(45) Date of Patent: Aug. 28, 2007

(54) CRAB MEAT EXTRACTING APPARATUS

(76) Inventor: Godfrey J. LeBoeuf, Jr., 1902 Bayou Blue Rd., Houma, LA (US) 70364

( * ) Notice: Subject to any disclaimer, the term of this patent is extended or adjusted under 35 U.S.C. 154(b) by 233 days.

(21) Appl. No.: 11/074,205

(22) Filed: Mar. 8, 2005

Related U.S. Application Data

(63) Continuation-in-part of application No. 10/693,596, filed on Oct. 27, 2003, now abandoned.

(51) Int. Cl.
*A22C 29/02* (2006.01)

(52) U.S. Cl. .................................. 452/9; 452/1; 452/6

(58) Field of Classification Search .................. 452/1, 452/6, 8, 9, 13, 15, 16, 17
See application file for complete search history.

(56) References Cited

U.S. PATENT DOCUMENTS

| | | | | |
|---|---|---|---|---|
| 1,831,448 A | * | 11/1931 | Henry et al. | 452/16 |
| 2,335,806 A | * | 11/1943 | Sjostrom | 452/6 |
| 2,517,899 A | * | 8/1950 | Logan | 452/6 |
| 3,486,188 A | * | 12/1969 | Senick | 452/6 |
| 3,696,465 A | * | 10/1972 | Rossnan | 452/8 |
| 3,921,256 A | * | 11/1975 | Huebotter | 452/9 |
| 4,255,835 A | * | 3/1981 | Demulder | 452/16 |
| 4,316,306 A | * | 2/1982 | Huebotter | 452/1 |
| 4,393,545 A | * | 7/1983 | O'Donnell | 452/16 |
| 4,513,478 A | * | 4/1985 | Trahan | 452/9 |
| 4,752,988 A | * | 6/1988 | Guglielmo et al. | 452/10 |
| 4,802,260 A | * | 2/1989 | Fletcher | 452/6 |
| 6,273,807 B1 | * | 8/2001 | Shelton | 452/3 |

FOREIGN PATENT DOCUMENTS

GB 2025754 * 1/1980

* cited by examiner

*Primary Examiner*—David Parsley
(74) *Attorney, Agent, or Firm*—David A. Lingbeck

(57) ABSTRACT

A crab meat extracting apparatus for extracting the meat from a boiled or cooked crab. The crab meat extracting apparatus includes a base including a tray having a top side; and also includes a crab support member being attached upon the top side of the tray; and further includes a crab compressing assembly including a arcuate crab compressing member being hingedly attached to the crab support member and being removably disposed upon the crab support member for compressing a shelled crab between the crab support member and the arcuate crab compressing member.

10 Claims, 3 Drawing Sheets

CRAB MEAT EXTRACTING APPARATUS

This is a continuation in part application of application Ser. No. 10/693,596 filed October 27, 2003 now abandoned.

BACKGROUND OF THE INVENTION

1. Field of the Invention The present invention relates to crab meat extractors and more particularly pertains to a new crab meat extracting apparatus for extracting the meat from a boiled or cooked crab.

2. Description of the Prior Art

The use of crab meat extractors is known in the prior art. More specifically, crab meat extractors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,921,256; U.S. Pat. No. 4,513,478; U.S. Pat. No. 4,202,077; U.S. Pat. No. 4,633,547; U.S. Pat. No. 4,523,349; and U.S. Pat. No. Des. 297,093.

While these devices fulfill their respective, particular objectives and requirements, the aforementioned patents do not disclose a new crab meat extracting apparatus. The prior art includes various types of crab meat extractors having handles and compressors.

SUMMARY OF THE INVENTION

The general purpose of the present invention, which will be described subsequently in greater detail, is to provide a new crab meat extracting apparatus which has many of the advantages of the crab meat extractors mentioned heretofore and many novel features that result in a new crab meat extracting apparatus which is not anticipated, rendered obvious, suggested, or even implied by any of the prior art crab meat extractors, either alone or in any combination thereof. The present invention includes a base member including a tray having a top side; and also includes a crab support member being attached upon the top side of the tray; and further includes a crab compressing assembly including a arcuate crab compressing member being hingedly attached to the crab support member and being removably disposed upon the crab support member for compressing a shelled crab between the crab support member and the arcuate crab compressing member. None of the prior art includes the combination of the elements of the present invention.

There has thus been outlined, rather broadly, the more important features of the crab meat extracting apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new crab meat extracting apparatus which has many of the advantages of the crab meat extractors mentioned heretofore and many novel features that result in a new crab meat extracting apparatus which is not anticipated, rendered obvious, suggested, or even implied by any of the prior art crab meat extractors, either alone or in any combination thereof.

Still another object of the present invention is to provide a new crab meat extracting apparatus for extracting the meat from a boiled or cooked crab.

Still yet another object of the present invention is to provide a new crab meat extracting apparatus that is easy and convenient to set up and use.

Even still another object of the present invention is to provide a new crab meat extracting apparatus that eliminates the mess usually associated with extracting meat from a crab.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
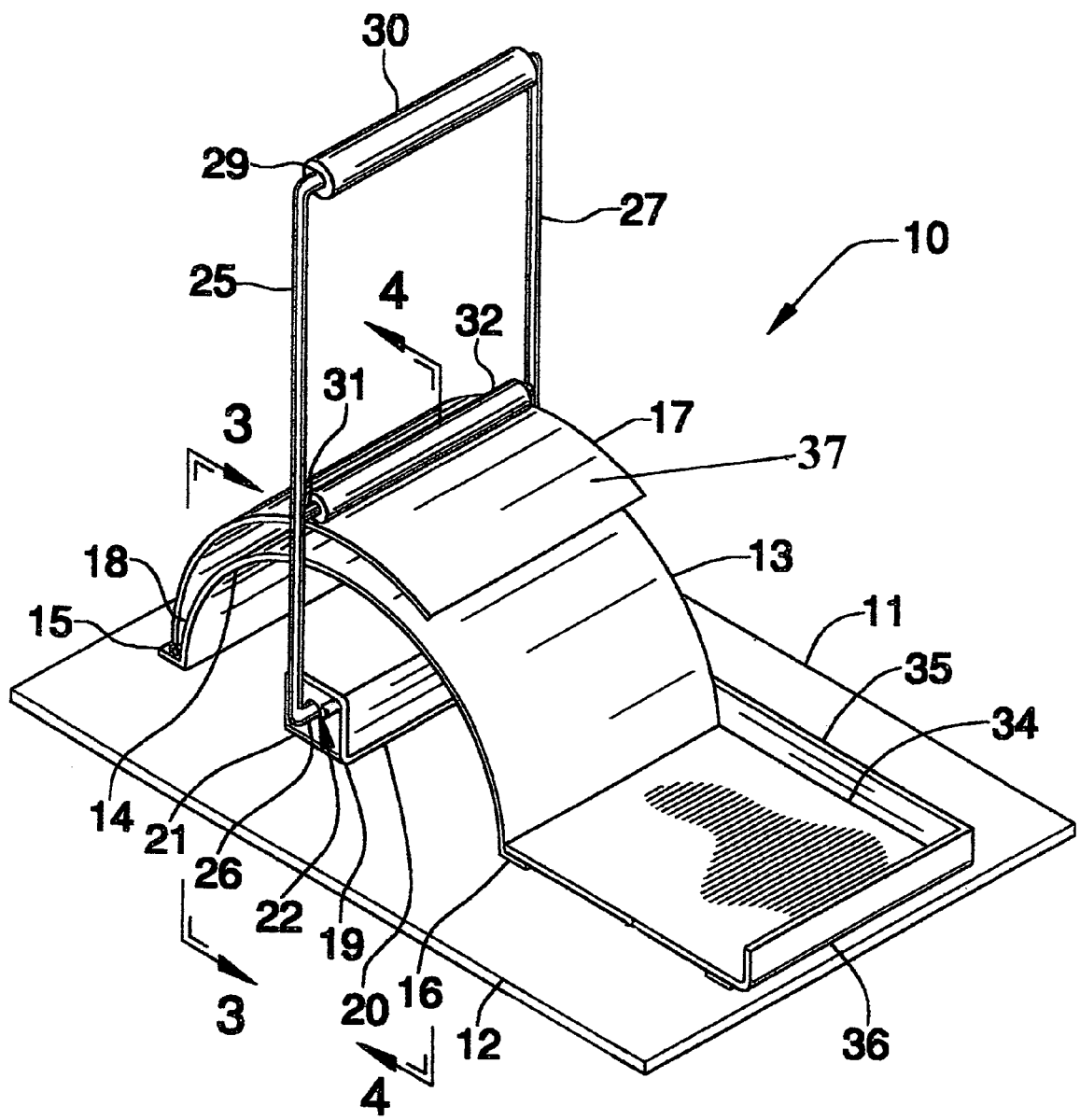
FIG. 1 is a perspective view of a new crab meat extracting apparatus according to the present invention.
Figure 2:
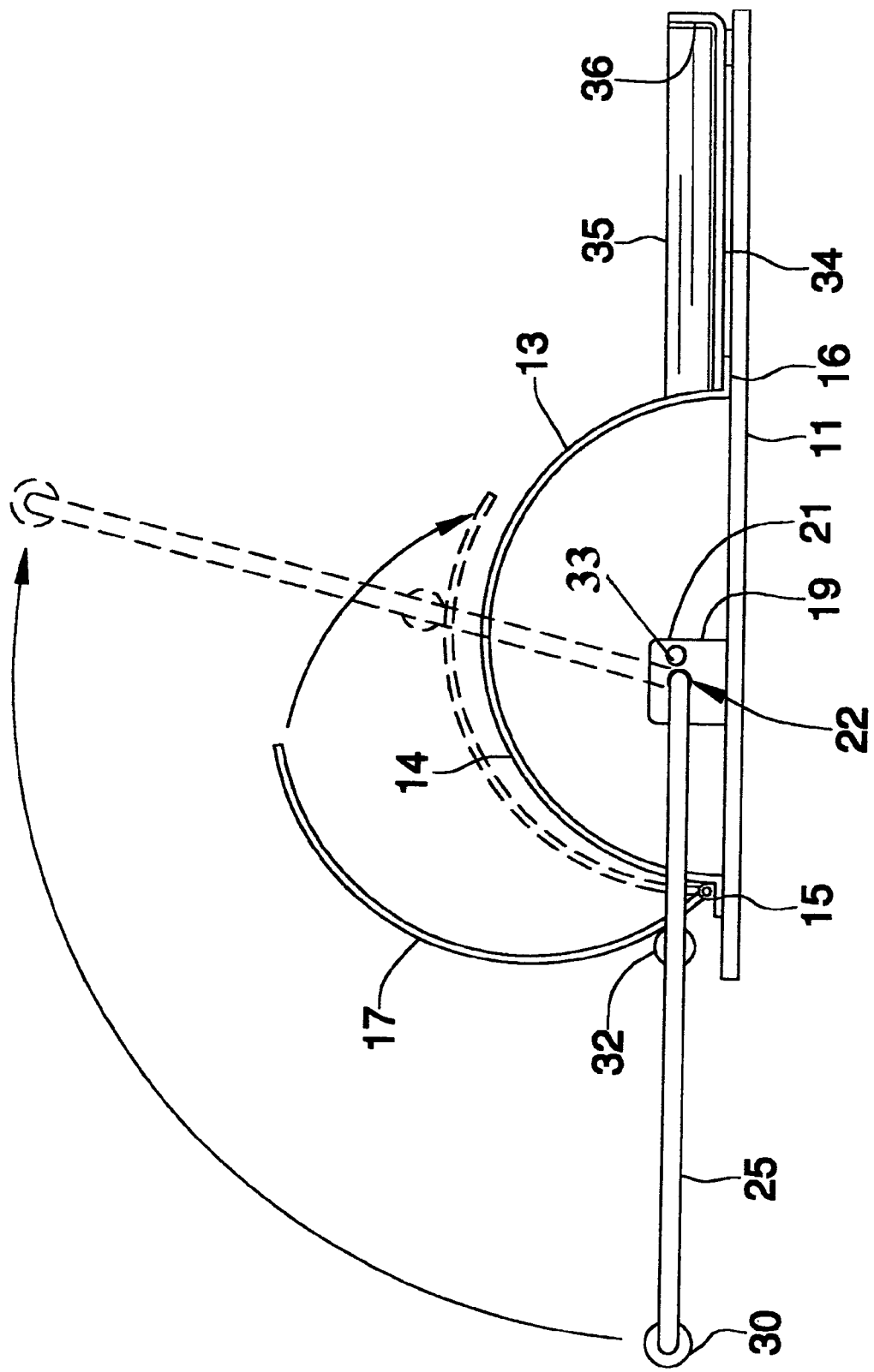
FIG. 2 is a side elevational view of the present invention.
Figure 3:
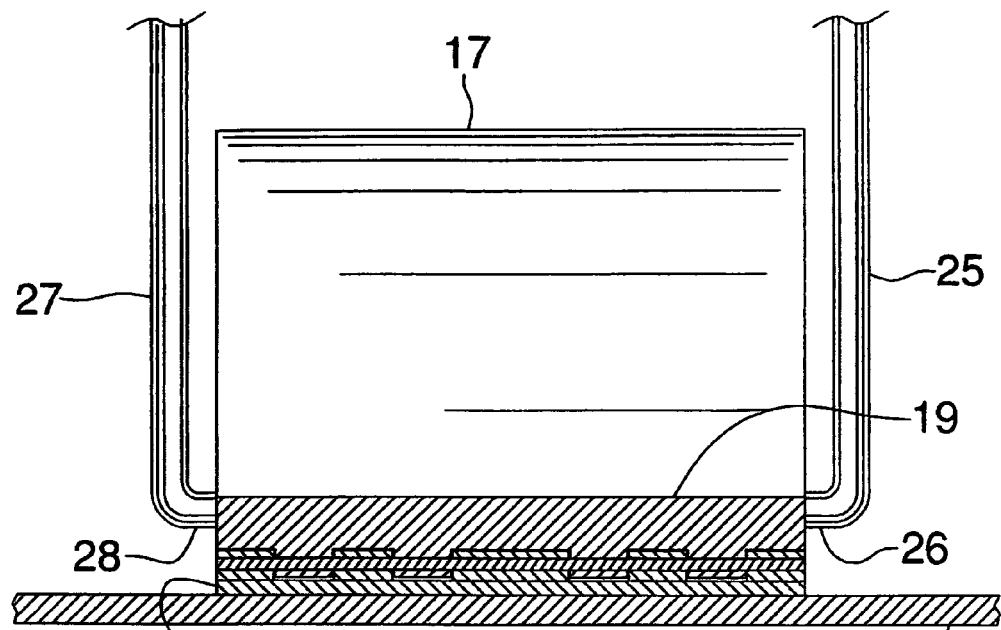
FIG. 3 is a lateral cross sectional view of the present invention.
Figure 4:
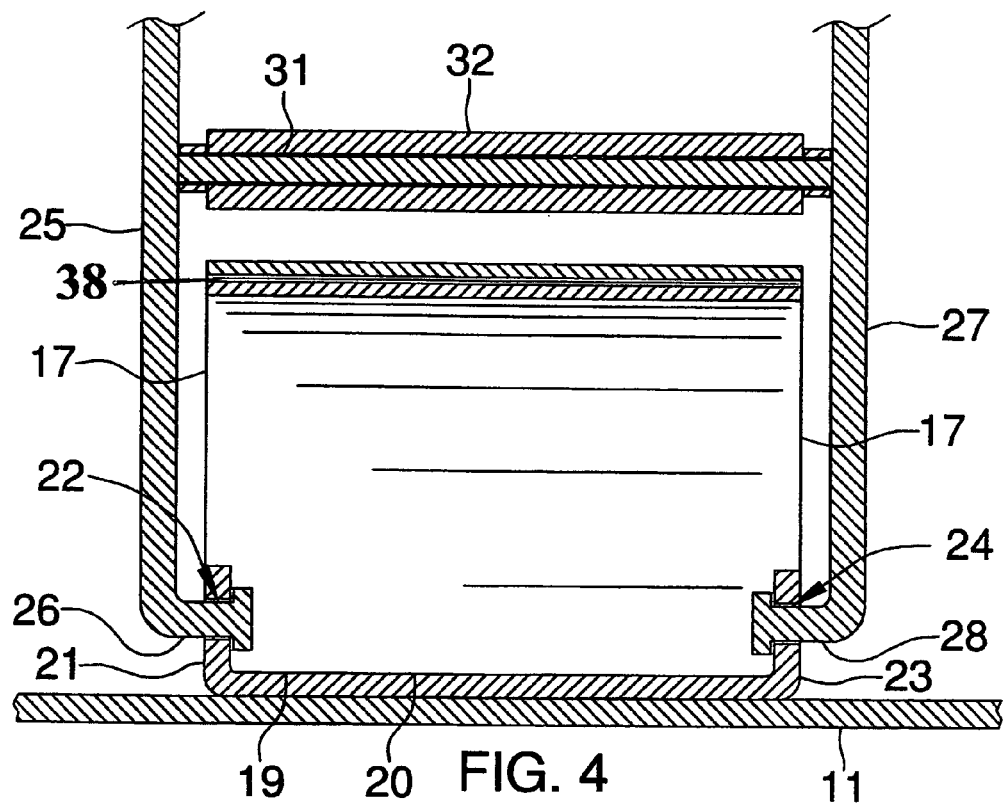
FIG. 4 is another lateral cross sectional view of the present invention.

With reference now to the drawings, and in particular to FIGS. 1 through 4 thereof, a new crab meat extracting apparatus embodying the principles and concepts of the present invention and generally designated by the reference numeral 10 will be described.

As best illustrated in FIGS. 1 through 4, the crab meat extracting apparatus 10 generally comprises a base including a tray 11 having a top side 12. A crab support member 13 is conventionally attached and welded upon the top side 12 of the tray 11. The crab support member 13 is a lightweight arch having a definite thickness and width and also having end portions 15, 16 which are conventionally fastened upon the top side 12 of the tray 11 and also having open space disposed below the lightweight arch which substantially reduces the overall weight of the crab meat extracting apparatus. The tray 11 includes a bottom wall 34, and also includes side walls 35 and end walls 36 being conventionally attached along a perimeter of the bottom wall 34 to keep the extracted crab meat upon the tray 11.

A crab compressing assembly includes an arcuate crab compressing member 17 which is hingedly attached to the crab support member 13. The arcuate crab compressing member 17 is removably disposed upon the crab support member 13 for compressing a shelled crab between the crab support member 13 and the arcuate crab compressing member 17. The arcuate crab compressing member 17 is longitudinally curved and has a first end 18 which is hingedly attached to one of the end portions 15, 16 of the crab support member 13, and also has a second end which is opposite to the first end 18. The arcuate crab compressing member 17 has a width of more than 3 inches, a length of more than 6 inches, a thickness of less than 1 inch, and smooth upper and lower surfaces 36,37. The arcuate crab compressing member 17 is disposed generally concentric to the crab support member 13 when the arcuate crab compressing member 17 is resting upon the crab support member 13. The crab compressing assembly also includes a bracket member 19 being conventionally attached and welded upon the top side 12 of the tray 11, and further includes a handle assembly being pivotally and removably mounted to the bracket member 19, and also includes a roller member 32 being conventionally mounted upon the handle assembly and being rollably engaged upon the arcuate crab compressing member 17. The bracket member 19 includes an elongate main portion 20 and also includes end portions 21,23 being angled relative to the elongate main portion 20, and being disposed generally perpendicular to the tray 11, and having holes 22,24 being disposed therethrough. The handle assembly includes a pair of elongate handle support members 25,27 having angled first end portions 26,28 each of which is pivotally disposed in the hole 22,24 of a respective end portion 21,23 of the bracket member 19, and also includes a handle support cross member 29 being integrally attached to second ends of and extending between the elongate handle support members 25,27, and also includes a roller support cross member 31 being conventionally attached intermediate of the first ends portions 26,28 and the second ends of and extending between the elongate handle support members 25,27, and further includes a handle member 30 being disposed about the handle support cross member 29. The crap compressing assembly further includes handle stop members 33 being securely and conventionally attached to the bracket member 19 for coming into contact with the handle member 30 to prevent and stop the roller member 32 from moving beyond the second end of the arcuate crab compressing member 17. The roller member 32 is rollably disposed about the roller support cross member 31, and is a lightweight elongate tubular member having a length substantially longer than a circumference thereof and also having a bore being disposed therethrough. The roller support cross member 32 is disposed through the bore of the roller member 32. The roller member 32 engages and rolls upon the upper surface 36 of the arcuate crab compressing member 17 no more than ½ inch from the edge of the second end of the arcuate crab compressing member 17 to effectively squeeze out the crab meat from the shelled crab; otherwise, the roller member 32 would simply squash the shelled crab and the crab meat.

In use, the user boils a crab and then removes the outer shell and the appendages of the crab and then holds the shelled crab upon the lightweight arch immediately below the apex of the lightweight arch. The user pivots the arcuate crab compressing member 17 to engage and hold the shelled crab upon the lightweight arch near the edge of the second end of the arcuate crab compressing member 17. The user then grasps the handle member 30 and pivots the handle assembly and moves the roller member upon the upper surface 36 of the arcuate crab compressing member 17 which presses the lower surface of the arcuate crab compressing member 17 upon the shelled crab thus squeezing the crab meat out and upon the tray 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the crab meat extracting apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A crab meat extracting apparatus comprising: a base including a tray having a top side, said tray including a bottom wall, and also including upwardly extending side and end walls being attached to and extending along a perimeter of said bottom wall;
   a crab support member being attached upon said top side of said tray, said crab support member being a lightweight arch formed from a substantially thin sheet of material, having a definite thickness and width and also having open space being disposed below said lightweight arch which substantially reduces the overall weight of said crab meat extracting apparatus; and
   a crab compressing assembly including an arcuate crab compressing member being hingedly attached to said crab support member and being removably disposed upon said crab support member for compressing a shelled crab between said crab support member and said arcuate crab compressing member, said arcuate crab compressing member being longitudinally curved and having a first end which is hingedly attached to one of said end portions of said crab support member, said arcuate crab compressing member being disposed generally concentric to said crab support member when said arcuate crab compressing member is resting upon said crab support member.

2. The crab meat extracting apparatus as described in claim 1, wherein said arcuate crab compressing member has a width of more than 3 inches, a length of more than 6 inches, a thickness of less than 1 inch, and smooth upper and lower surfaces.

3. The crab meat extracting apparatus as described in claim 1, wherein said crab compressing assembly also includes a bracket member being attached to said top side of said tray, and further includes a handle assembly being pivotally mounted to said bracket member, and also includes a roller member being mounted upon said handle assembly and being rollably engaged upon said arcuate crab compressing member.

4. The crab meat extracting apparatus as described in claim 3, wherein said bracket member includes an elongate main portion and also includes end portions being angled relative to said elongate main portion, and being disposed generally perpendicular to said tray, and having holes being disposed therethrough.

5. The crab meat extracting apparatus as described in claim 4, wherein said handle assembly includes a pair of elongate handle support members having angled first end portions each of which is pivotally disposed in said hole of a respective said end portion of said bracket member, and also includes a handle support cross member being attached to second ends of and extending between said elongate handle support members, and also includes a roller support cross member being attached intermediate of said first ends portions and said second ends of and extending between said elongate handle support members, and further includes a handle member being disposed about said handle support cross member, said roller member being rollably disposed about said roller support cross member.

6. The crab meat extracting apparatus as described in claim 5, wherein said roller member is a lightweight elongate tubular member having a length substantially longer than a circumference thereof and also having a bore being disposed therethrough, said roller support cross member being disposed through said bore of said roller member.

7. The crab meat extracting apparatus as described in claim 6, wherein said roller member engages and rolls upon said arcuate crab compressing member no more than ½ inch from the edge of said second end of said arcuate crab compressing member to effectively squeeze out the crab meat from the shelled crab; otherwise, said roller member simply squashes the shelled crab and the crab meat.

8. The crab meat extracting apparatus as described in claim 7, wherein said crab compressing assembly further includes handle stop members being securely attached to said bracket member for coming into contact with said handle member to prevent and stop said roller member from moving beyond said second end of said arcuate crab compressing member.

9. A method of extracting crab meat from a crab includes the steps of:
   providing a crab meat extracting apparatus including, a tray having a bottom wall and side and end walls extending upwardly from said bottom wall and attached to and extending along a perimeter of said bottom wall, and further including a crab support member comprising a lightweight arch formed from a substantially thin sheet of material, and further including an arcuate crab compressing member concentric with said arch having a second end, and further including a handle member and a roller member;
   boiling a crab;
   removing the outer shell and appendages of the crab resulting in a shelled crab;
   holding the shelled crab upon said lightweight arch;
   pivoting said arcuate crab compressing member to engage and hold the shelled crab upon said lightweight arch near the edge of said second end of said arcuate crab compressing member;
   and moving said roller member upon said upper surface of said arcuate crab compressing member which presses said lower surface of said crab compressing member upon the shelled crab and squeezes the crab meat out and upon said tray.

10. The method of extracting crab meat from a crab as described in claim 9, wherein the step of holding the shelled crab upon said lightweight arch further includes the step of holding the shelled crab immediately below the apex of said lightweight arch.

* * * * *